United States Patent
Chan

(10) Patent No.: US 6,728,184 B2
(45) Date of Patent: Apr. 27, 2004

(54) METHOD AND DEVICE OF DETERMINING THE SLICE LEVEL OF THE RADIO FREQUENCY RIPPLE SIGNAL IN AN OPTICAL STORAGE DEVICE

(75) Inventor: Yi-Chung Chan, Taipei (TW)

(73) Assignee: Via Technologies, Inc., Taipei (TW)

( * ) Notice: Subject to any disclaimer, the term of this patent is extended or adjusted under 35 U.S.C. 154(b) by 428 days.

(21) Appl. No.: 09/764,339

(22) Filed: Jan. 19, 2001

(65) Prior Publication Data

US 2001/0010673 A1 Aug. 2, 2001

(30) Foreign Application Priority Data

Feb. 1, 2000 (TW) ......................................... 89101714 A

(51) Int. Cl.[7] ................................................. G11B 7/00
(52) U.S. Cl. ................................. 369/53.28; 369/44.28; 369/124.15
(58) Field of Search ......................... 369/53.12, 53.23, 369/53.28, 53.33, 53.35, 59.17, 59.18, 124.15, 44.28

(56) References Cited

U.S. PATENT DOCUMENTS

| | | | | |
|---|---|---|---|---|
| 5,351,222 A | * | 9/1994 | Ikeda et al. ............... | 369/44.28 |
| 6,167,011 A | * | 12/2000 | Sun et al. ................. | 369/44.28 |
| 6,301,201 B1 | * | 10/2001 | Takeya ..................... | 369/44.28 |
| 6,324,135 B1 | * | 11/2001 | Kim et al. ................ | 369/53.31 |

* cited by examiner

Primary Examiner—Doris H. To
Assistant Examiner—Jorge Ortiz-Criado
(74) Attorney, Agent, or Firm—Rabin & Berdo, P.C.

(57) ABSTRACT

A method and device of determining the slice level of a radio frequency ripple (RFRP) signal for performing a tracking operation in a tracking controller of an optical storage device. The optical storage device receives a tracking error (TE) signal, a radio frequency center (RFCT) signal, and the RFRP signal, and then outputs a TE_input signal related to the slice level. The method includes the following steps: a. obtaining a count value when the absolute value of the TE signal is smaller than a threshold value; otherwise, resetting the count value; b. executing step c when the count value is smaller than a predetermined count value; otherwise, outputting the TE signal as the TE_input signal; and c. outputting the TE signal as the TE_input signal when the RFRP signal is greater than the RFCT signal; otherwise outputting a peak value of the TE signal as the TE_input signal.

6 Claims, 6 Drawing Sheets

METHOD AND DEVICE OF DETERMINING THE SLICE LEVEL OF THE RADIO FREQUENCY RIPPLE SIGNAL IN AN OPTICAL STORAGE DEVICE

This application incorporates by reference Taiwanese application Serial No. 89101714, Filed Feb. 1st, 2000.

BACKGROUND OF THE INVENTION

1. Field of the Invention

The invention relates in general to a method and device of determining the slice level of a radio frequency ripple (RFRP) signal in an optical storage device, and more particularly to the method and device of using a radio frequency center (RFCT) signal, as the slice level of the RFRP signal when the optical storage device is on tracking.

2. Description of the Related Art

FIG. 1 is a block diagram illustrating the structure of an optical storage device. The optical storage device indicated here includes at least a CD-ROM drive and a Digital Versatile Disk (DVD) drive.

Referring to FIG. 1, a spindle motor 100 is used to drive an optical disk 101 to the required rotation speed. A sled motor 102 is used to drive the sled 105 which is equipped with an optical pickup head 104 for rough tracking and seeking operations. The tracking operation is used to drive the optical pickup head 104 to a certain track on the optical disk 101 for reading data.

Fine-tuning operations include focusing and tracking operations. The focusing operation involves the objective lens 120 running in a vertical direction in order to accurately read data on the optical disk 101 whereas the tracking operation involves the objective lens 120 running in a horizontal direction to find the desired track.

When a laser is focused on the optical disk 101, the reflected light is received by the optical sensor on the optical pickup head 104. Optical pickup head 104 outputs the signals corresponding to data stored in the optical disk 101 as well as signals for various servo controls.

The signals outputted from the optical pickup head 104 are transformed by a preamplifier 106 into radio frequency (RF) signals and other signals for various servo controls such as tracking error (TE) signal, RFRP signal, and RFCT signal. These signals are then inputted to the control integrated circuit (control IC) for processing. Included in the control IC 108 are, for example, a digital signal processor (DSP) in addition to other analog or digital circuitry. The control IC 108 obtains an output data by performing the demodulation and error correction of the received RF signals and sends out the output data to the decoder 112 and then the host computer 114 for further processing. Meanwhile, the control IC 108 processes the servo signals with necessary compensations and outputs to power amplifiers 116 and 118 to drive the spindle motor 100, the sled motor 102, the focusing actuator and the tracking actuator.

The microprocessor 122 is responsible for the overall operation of the disk as well as the user interfaces such as controlling the opening of the disk tray.

Generally, there is a phenomenon called run-out for the optical disk 101. The run-out phenomenon occurs due to the fact that the circular hole of the optical disk 101 is not located precisely in the center. As a result, when the optical disk 101 is spinning, the slight offset of the center hole causes track being read to run-out of the range of the objective lens 120. Moreover, vertical and horizontal vibrations sometimes occur when the optical disk 101 is spinning, and a misread of the track is caused. As can be seen, tracking is not a trivial pursuit and as a result, a tracking controller is needed. FIG. 2 is a block diagram illustrating the tracking servo apparatus of a optical storage device. Referring to FIG. 2, the tracking process is illustrated as follows. The optical sensor 200 receives the reflected light from the disk, and then outputs the received signals to the preamplifier 202. These signals are amplified by the preamplifier 202 and transmitted to the tracking controller 204 and then to the compensators 206 and 208 for the desired frequency response compensation of the system. The compensated signals are then amplified by the power amplifiers 210 and 212 to drive the objective lens actuator 214 and the sled motor 216, respectively. Then a position of the objective lens is obtained, and the position of the objective lens is fed back along with a disk eccentricity and vibration until the optical sensor 200 has exactly tracked the track needed.

In the above description, the tracking controller 204 and the compensators 206 and 208 mentioned are located in the control IC 108 mentioned in FIG. 1.

FIG. 3 illustrates various signals needed by the tracking controller 204 and the compensator 206 mentioned in FIG. 2. The signals inputted to the tracking controller 204 are transmitted from the preamplifier 202 mentioned in FIG. 2.

FIG. 4 is a timing diagram of various signals illustrated in FIG. 3. Before time T7, the objective lens moves outward relative to the optical disk whereas after time T7, the objective lens moves inward relative to the optical disk. During the outward movement of the objective lens (i.e. before time T7), there are negative and positive feedback periods. In the negative feedback period, for example, between time T1 and T3, the TE signal makes the objective lens move toward the track needed. On the other hand, in the positive feedback period, between time T3 and T5, the TE signal makes the objective lens move away from the track needed.

Referring to FIG. 4, when the objective lens is moving outward, the TE signal is in the negative feedback period when the slope of the TE signal is positive and in the positive feedback period when the slope of the TE signal is negative. On the contrary, when the objective lens is moving inward, the TE signal is in the positive feedback period when the slope of the TE signal is positive and in the negative feedback period when the slope of the TE signal is negative.

The TE signal is an index of the tracking operation. For example, during time T2 and T6, the amplitude of the TE signal is 0 which means that laser spot is on the track needed. However, when laser spot is located between two tracks, the amplitude of the TE signal is also 0. An example is time T4 in which TE is zero during the positive feedback period. On the other hand, when laser spot is on the edge of a track, the amplitude of the TE signal is highest. For example, at time T1 or T3.

The RFRP signal is derived from the RF signal which is the data signal read from the optical disk. When the laser spot is tracking on the desired track, the amplitude of the RF signal is highest; when the laser spot is between two tracks, the amplitude of the RF signal is lowest. The RFRP signal is obtained either by a difference value between the bottom envelope and the peak envelope of the RF signal or by a low-pass filtering of the RF signal.

When the laser spot is tracking on the track 103 in FIG. 1, the amplitude of the RFRP signal is highest while when the laser spot is between two tracks, the amplitude of the RFRP signal is lowest.

The relationship between the phases of the RFRP signal and the TE signal is illustrated as follows. When the objective lens is moving outward, that is, before time T7, the phase of the RFRP signal is ahead of the phase of the TE signal by 90 degrees. On the other hand, when the objective lens is moving inward, that is, after time T7, the phase of the RFRP signal is behind the phase of the TE signal by 90 degrees as shown in FIG. 4.

In FIG. 4, a radio frequency zero crossing (RFZC) signal is derived from the RFRP signal. While tracking in the conventional technique, there is a fixed reference value, for example the DC level of the RFRP signal during tracking off period, for the slice level of the RFRP signal. When the RFRP signal is larger than the slice level, the RFZC signal is at high level while the RFRP signal is lower than the slice level, the RFZC signal is at low level. Moreover, the RFZC signal is the same as the positive or negative feedback periods of the TE signal. That is, when the RFZC signal is at high level, the TE signal is in negative feedback period and as a result, the TE signal can be utilized for tracking. On the contrary, when the RFZC signal is at low level, the TE signal is in positive feedback period which results in the tracking servo apparatus to move in the opposite direction of the track needed and so during the positive feedback period, the TE signal cannot be used for tracking.

Owing to the characteristics of the RFZC signal mention above, the RFZC signal is used as an index for whether TE signal is inputted to compensator 206 as the TE_input signal.

During the positive feedback period, the TE signal causes the tracking servo apparatus to move in the wrong direction and so the TE signal in the positive feedback period is not adopted as the TE_input signal. The TE_input signal is maintained in the peak amplitude of the TE signal. The so-called hysteresis effect can prevent errors due to the tracking servo apparatus as well as reduce the time needed for tracking operation.

Nevertheless, the conventional method of using a fixed reference value as the slice level of the RFRP signal can produce problems under some conditions. For example, during the tracking operation, sometimes there are disturbances resulting in the waveform of the RFRP signal to flutter up and down, that is, the dc value of the RFRP signal is not horizontal but fluctuates up and down. This situation occurs when the tracking operation is at high speed, the reflection rate decreases, or due to a defect of the CD-ROM disk. The situation is especially serious for the DVD ROM disk.

As such, if the slice level of the RFZC signal is a fixed reference value, the RFZC signal obtained is erroneous as well as the determination for the positive or negative feedback periods. This results in unstable tracking operation. If the fluttering degree of the RFRP signal is too high, the RFRP signal does not intersect the slice level, causing errors to occur and leading to the failure of the tracking operation. Ultimately, data on the CD-ROM disk cannot be read correctly.

SUMMARY OF THE INVENTION

It is therefore an object of the invention to provide an improved and simplified method and device for determining the slice level of the RFRP signal when tracking which effectively solves the problem mentioned above and achieves the purpose of the tracking operation.

The invention achieves the above-identified objects by providing a method of determining the slice level of a RFRP signal for the purpose of the tracking operation in a tracking controller of an optical storage device. The optical storage device receives a TE signal an RFCT signal, and the RFRP signal and then outputs a TE_input signal related to the slice level. The method includes the following steps: a. obtaining a count value when the absolute value of the TE signal is smaller than a threshold value; otherwise, resetting the count value; b. otherwise, outputting the TE signal as the TE_input signal unless the count value is smaller than a predetermined count value; and c. if the count value is smaller than a predetermined count value, outputting the TE signal as the TE_input signal when the RFRP signal is greater than the RFCT signal and otherwise outputting a peak value of the TE signal as the TE_in put signal.

The invention achieves the above-identified objects by providing a control circuit using a RFCT signal as the slice level in an optical storage device, outputting a TE_input signal according to a TE signal, RFCT signal, and RFRP signal. The optical storage device includes a first comparator, counter, second comparator, and third comparator. The first comparator is for comparing the TE signal with a threshold value. The counter generates a count value when the amplitude of the TE signal is smaller than the threshold value, and resets the count value when the amplitude of the TE signal is larger than the threshold value. The second comparator outputs the TE signal as the TE_input signal if the count value is greater than a predetermined count value. The third comparator is activated when the amplitude of the TE signal is larger than the threshold value or the count value is smaller than the predetermined count value. In addition, the third comparator outputs the TE signal as the TE_input signal if the RFRP signal is larger than the RFCT signal; otherwise, the third comparator outputs the peak of the TE signal as the TE_input signal.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The method of determining the slice level of the radio frequency ripple (RFRP) signal while tracking according to the invention is applied in the tracking controller of an optical storage system. The radio frequency center (RFCT) signal is used as the slice level while tracking.

Figure 1:
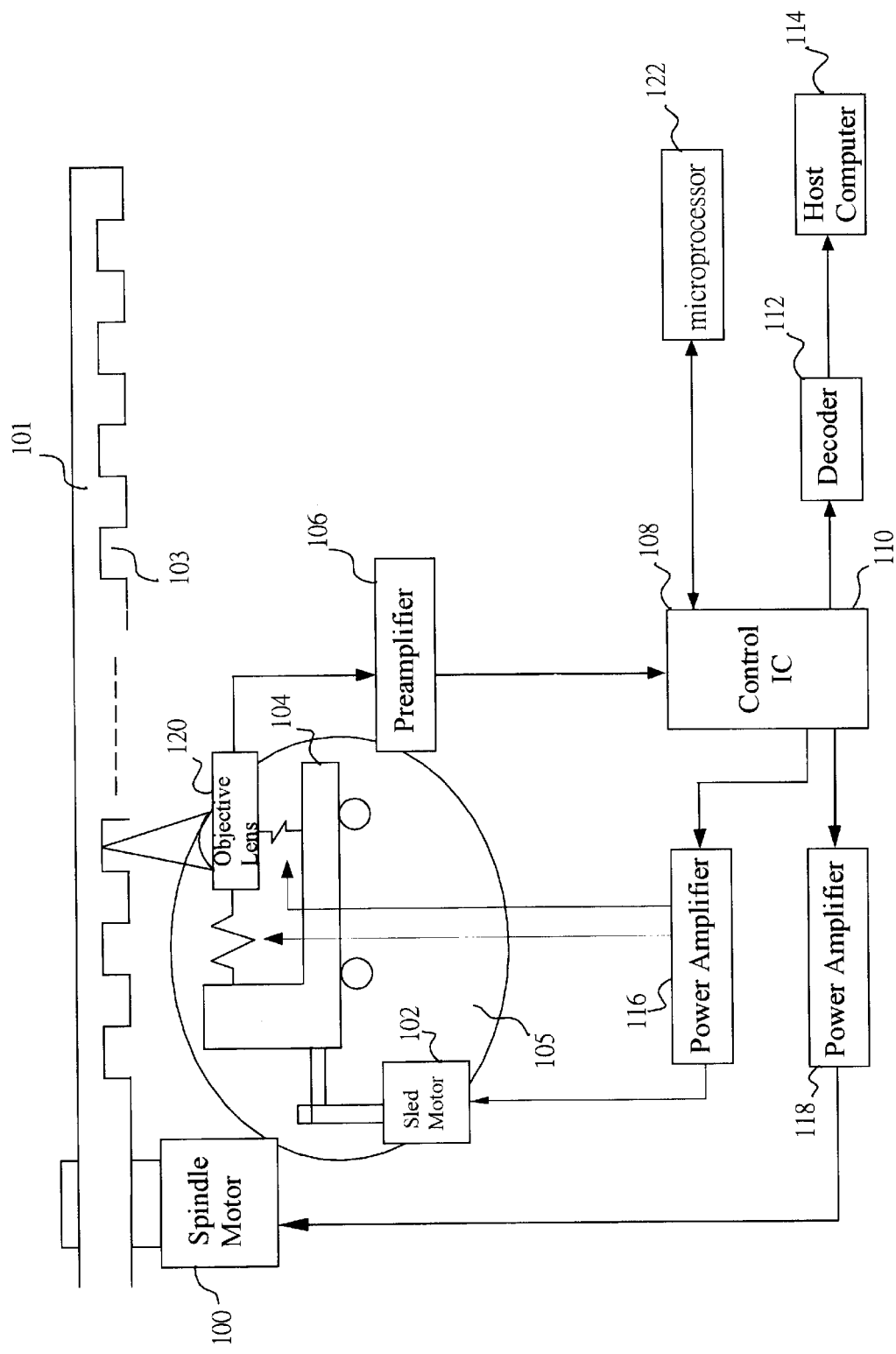
FIG. 1 (Prior Art) is a block diagram illustrating the structure of a CD-ROM drive.
Figure 2:
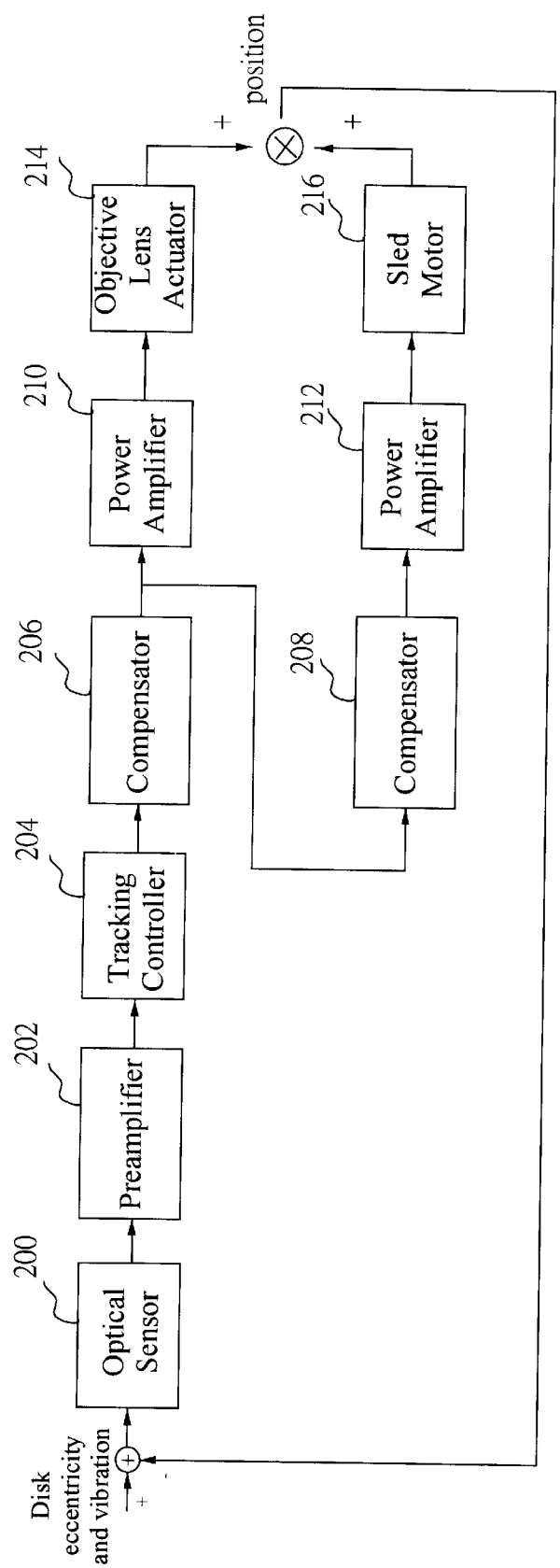
FIG. 2 (Prior Art) is a block diagram illustrating the tracking servo apparatus of a CD-ROM drive.
Figure 3:
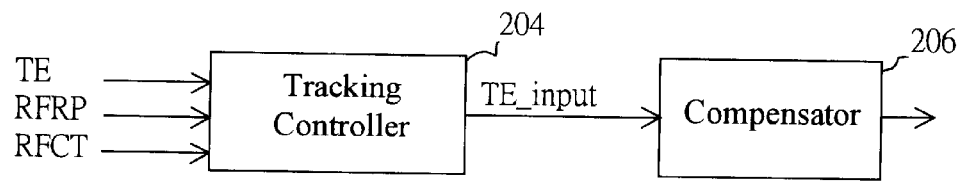
FIG. 3 (Prior Art) shows various signals needed by the tracking controller 204 and the compensator 206 mentioned in FIG. 2.
Figure 4:
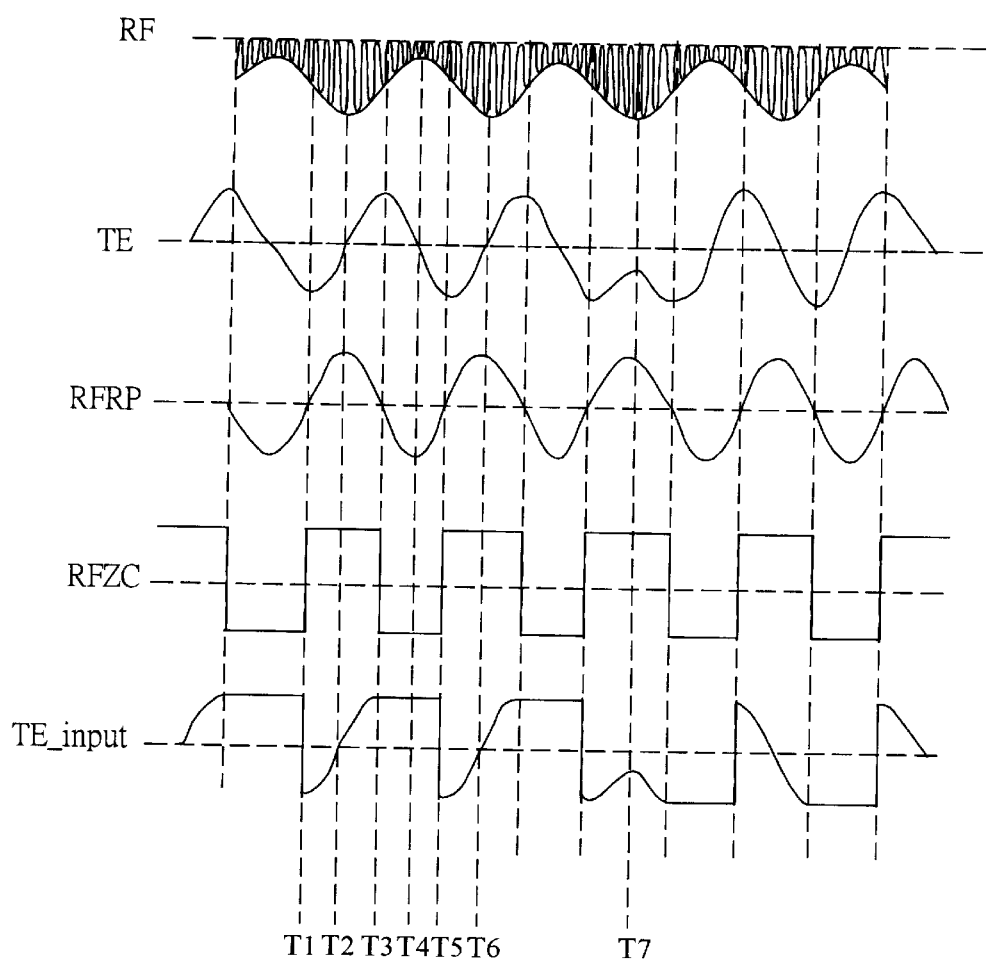
FIG. 4 (Prior Art) is a timing diagram of various signals illustrated in FIG. 3.
Figure 5:
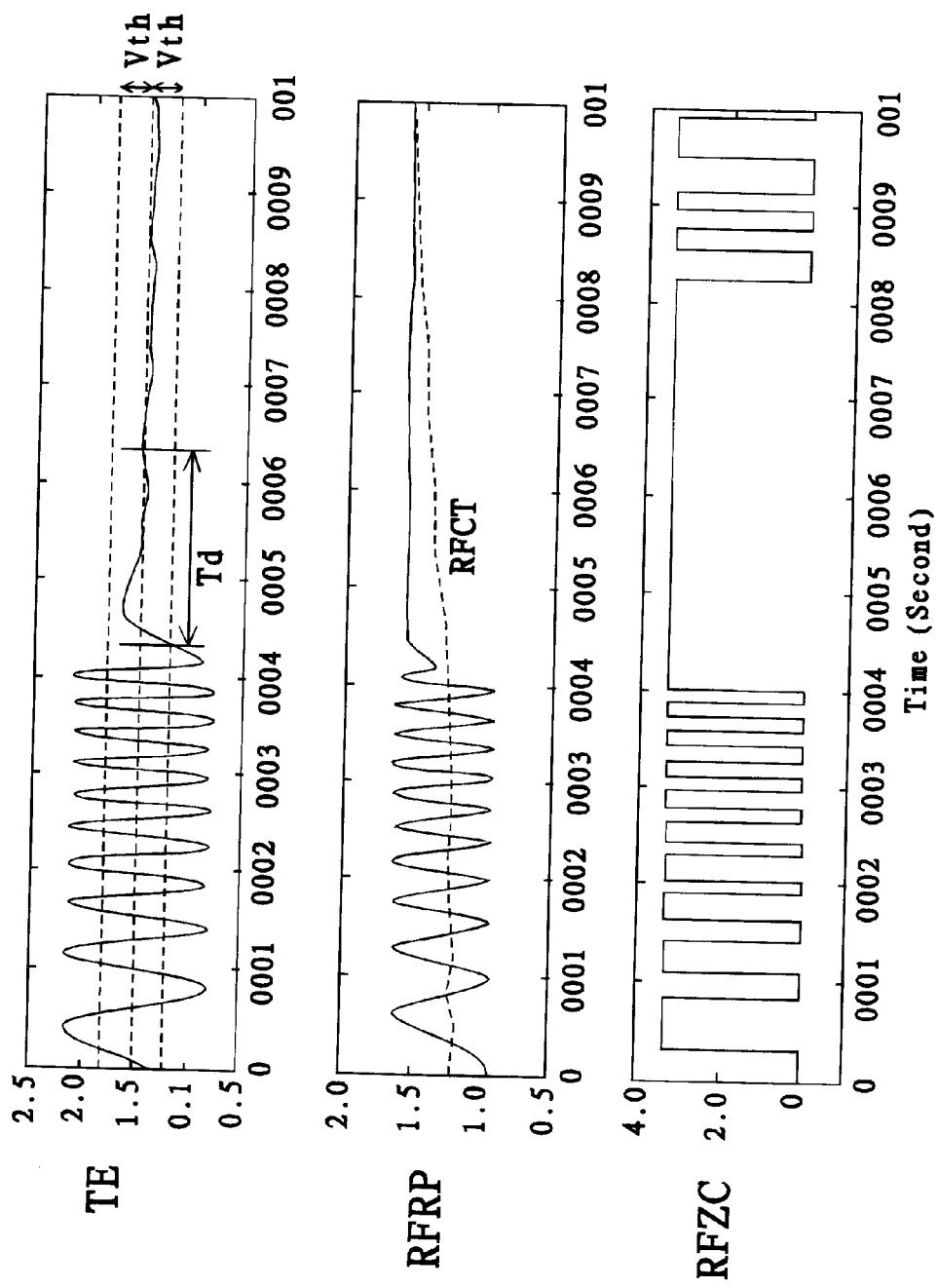
FIG. 5 is a timing diagram of the TE signal, the RFCT signal, and the RFRP signal while tracking.

Referring to FIG. 5, the RFCT signal is obtained from a preamplifier. The RFCT signal is obtained from low-pass filtering of the RFRP signal or averaging the values of the peak and bottom envelope of the RFRP signal. As a result, the fluttering of the RFCT signal is the same as the RFRP signal.

Due to this characteristic, the RFCT signal is usually used to be the slice level from which the RFZC signal can be obtained while the optical storage device is in a high speed seeking state. Then, the RFZC signal is used to calculate the number of tracks and the speed of seeking. Conventionally, the RFCT signal is not used in tracking operations. The reason is illustrated as follows. When the optical storage device has tracked exactly, the RFRP signal rises to a high level and keeps almost constant. At the same time, the RFCT signal rises along with the RFRP signal and gets close to the RFRP signal. As a result, the intersections between the two signals increase and are irregular, leading to erroneous RFZC signal. The erroneous RFZC signal will conflict with the hysteresis effect of the system and generate a wrong signal to the system. Therefore, errors occur if the RPCT signal is still used as the slice level of the RFZC signal at this time.

When the track read is tracked almost precisely, the amplitude of the TE signal is set to zero. This is because, imprecisely, the amplitude of the TE signal is zero. This characteristic is used to overcome the problem of conventional technology.

As shown in FIG. 5, a predetermined threshold value Vth is set. A threshold area is formed by the positive and negative threshold values, +Vth and −Vth. The threshold area is used to determine whether the TE signal is convergent or not. The method uses a counter and a predetermined count value. The predetermined count value is inversely proportional to the bandwidth of the RFCT signal and is smaller than the count value needed for making the RFCT signal get close to the RFRP signal as the tracking operation is completed.

When the TE signal falls within the threshold area, the counter is initialized. When a count value of the counter exceeds the predetermined count value, it means the TE signal is converging and the tracking operation is about to be completed. As mentioned before, the erroneous RFZC signal is almost, but not yet, generated. In the method of determining the slice level of the RFRP signal according to the invention, the function of hysteresis is turned off at this time to prevent the generation of an erroneous RFZC signal and errors for the tracking operation.

On the other hand, if the count value of the counter is less than the predetermined count value, it means the TE signal has not yet converged; that is, the tracking operation is not yet completed. As a result, the function of hysteresis is still being performed.

Therefore, the method of determining the slice level of the RFRP signal according to the preferred embodiment of the invention indeed solves the problem found in the conventional method and can effectively complete the tracking operation.

Figure 6:
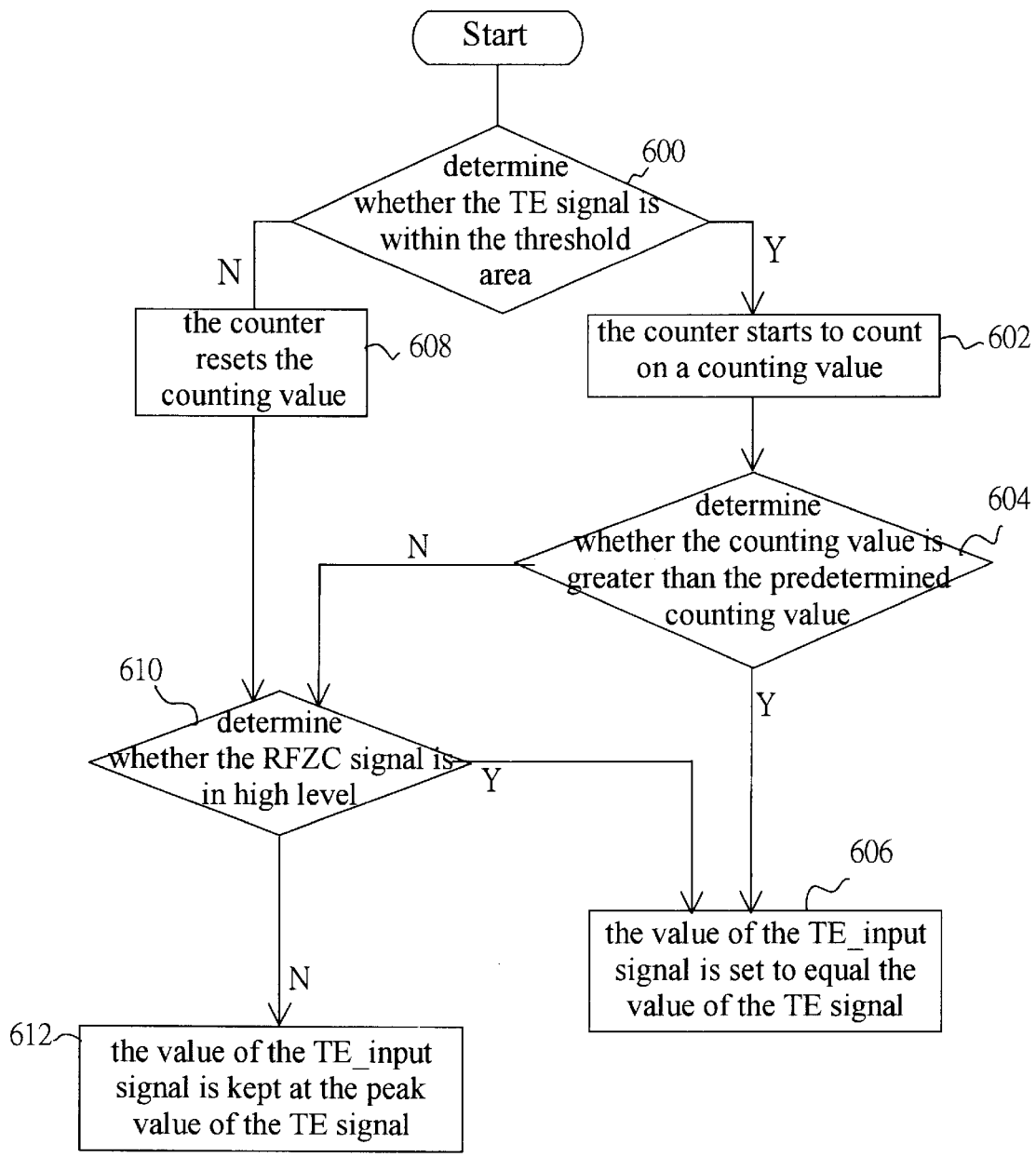
FIG. 6 is a flow chart illustrating the method of determining the slice level of the RFRP signal while tracking according to the invention.

Referring to FIG. 6, a flow chart of the method of determining the slice level of the RFRP signal according to the preferred embodiment of the invention is shown. In step 600, it is determined whether the TE signal is within the threshold area. This can be determined by deducing whether the absolute value of the TE signal is less than the threshold value such as the threshold value Vth shown in FIG. 5.

When the absolute value of the TE signal is less than the threshold value, it means that the TE signal is within the threshold area. In step 602, the counter then starts to count on a count value.

Next, in step 604, it is determined whether the count value is greater than the predetermined count value. When the count value is greater than the predetermined count value, it means the tracking operation is completed. In step 606, the TE_input signal is set as the TE signal.

On the other hand, in step 600, when the TE signal is not within the threshold area, that is, the absolute value of the TE signal is larger than the threshold value, the counter resets the count value as in step 608. Next, step 610 is executed.

In step 604, when the count value of the counter is smaller than the predetermined count value, it means that the tracking operation is not yet completed. Step 610 is then executed.

There are two conditions for executing step 610: one is that the TE signal is not within the threshold area and the other is that the tracking operation is not yet completed although the TE signal is within the threshold area. Since the RFZC signal at this time is correct, it can be used as the index for determining whether the TE signal is in the positive or negative feedback periods.

In step 610, it is determined whether the RFZC signal is at high level; that is, whether the RFRP signal is greater than the RFCT signal. When the RFZC signal is at high level, it means that the TE signal is in a negative feedback period and the TE signal at this time can be used as the index. In step 606, the TE_input signal is then set as the TE signal.

In step 610, if the RFZC signal is at low level, that is, the RFRP signal is smaller than the RFCT signal, it means the TE signal is in a positive feedback period, which leads to errors. As a result, the TE signal at this time cannot be used as an index. In step 612, the TE_input signal is then kept at the peak value of the TE signal, which is called the function of hysteresis.

Afterwards, the TE_input signal is inputted to a compensator for further processes until the tracking operation is completed.

Figure 7:
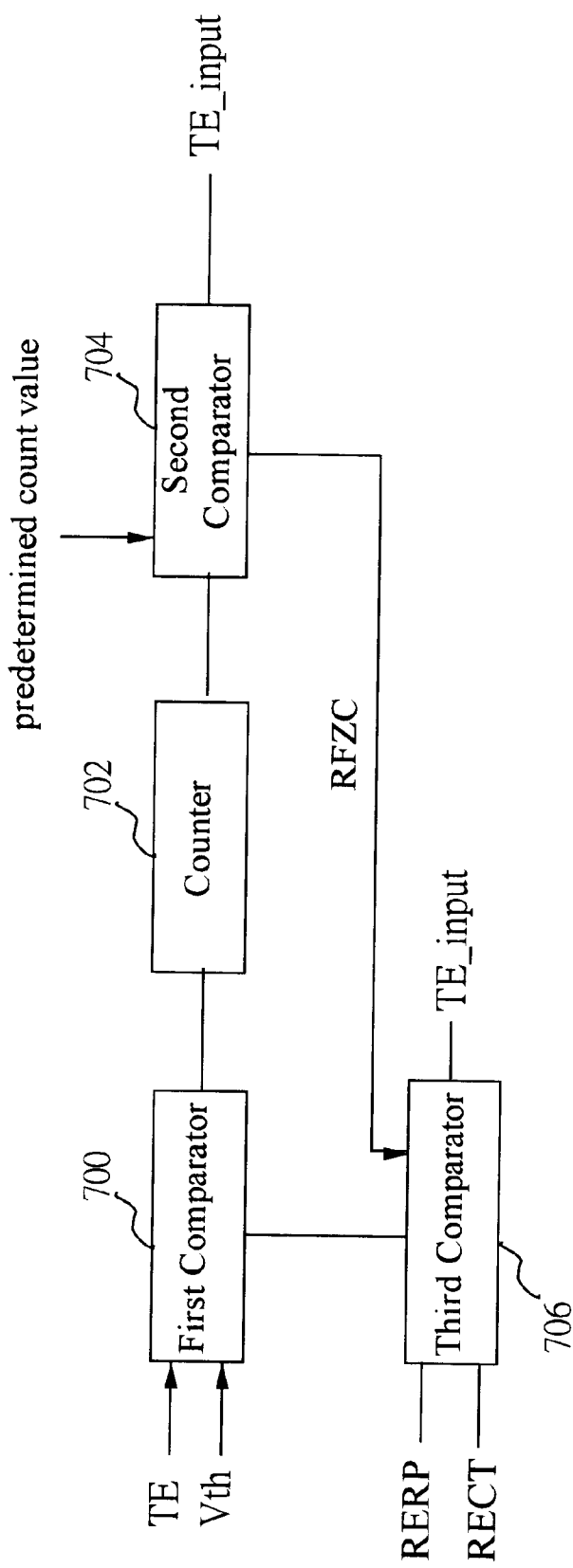
FIG. 7 is a block diagram showing the structure of the control circuit that uses the RFCT signal as the slice level of the RFRP signal according to the invention.

Referring to FIG. 7, a block diagram illustrating the structure of the control circuit using the RFCT signal as the slice level of the RFRP signal according to the invention is shown. The control circuit is complemented by, for example, a digital signal process (DSP) chip.

As shown in FIG. 7, the control circuit receives the TE signal, the RFRP signal, and the RFCT signal and outputs the TE_input signal. The control circuit includes a first comparator 700, a counter 702, a second comparator 704 and a third comparator 706.

The first comparator 700 compares the TE signal with a threshold value for determining whether the absolute value of the TE signal is smaller than the threshold value. The counter 702 is connected to the first comparator 700 for counting a count value. When the absolute value of the TE signal is smaller than the threshold value, the counter 700 starts to count. On the other hand, when the absolute value of the TE signal is larger than the threshold value, the counter 702 is reset.

The second comparator 704 is connected to the counter 702 for comparing whether the count value of the counter 702 with the predetermined count value. When the count value of the counter 702 is greater than the predetermined value, the TE signal is outputted as the TE_input signal.

The third comparator 706 is connected to the first comparator 700 and the second comparator 704. The third comparator 706 is used to compare the RFRP signal with the RFCT signal. The third comparator 706 is activated when the absolute value of the TE signal is greater than the threshold value or the count value is smaller than the predetermined count value. When the RFRP signal is greater than the RFCT signal, the TE signal is outputted as the TE_input. On the other hand, when the RFRP signal is smaller than the RFCT signal, the peak value of the TE signal is outputted as the TE_input.

The method and device of determining the slice level of the RFRP signal when tracking according to the preferred embodiment of the invention can effectively solve the problem of the conventional method of using a fixed value as the slice level. For example, the RFRP signal may flutter up and down due to disturbances during the tracking operation. The disturbances are caused when the tracking operation is at high speed, the low reflection rate of the CD-ROM disk, or the disturbance caused by the DVD ROM disk. As a result, the RFZC signal is erroneous during this time, which leads to the difficulty of tracking correctly. The worst case is that it can not track at all; that is, the optical disk, such as CD-ROM disk, can not be read.

Using the RFCT signal as the slice level of the RFRP signal can effectively solve the problem found in the conventional method. The optical storage device drive can more effectively achieve the purpose of the tracking operation.

While the invention has been described by way of example and in terms of the preferred embodiment, it is to be understood that the invention is not limited to the disclosed embodiment. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of determining a slice level of a radio frequency ripple (RFRP) signal in an optical storage device, receiving a tracking error (TE) signal, a radio frequency center (RFCT) signal, and the RFRP signal and outputting a TE_input signal related to the slice level, comprising the steps of:
   a. comparing the absolute value of the TE signal to a threshold value;
   b. if the absolute value of the TE signal is greater than the threshold value, resetting a count value;
   c. if the absolute value of the TE signal is smaller than the threshold value, starting to count and obtaining the count value;
   d. if the count value obtained in step c is greater than a predetermined count value, which corresponds to when a tracking operation is about to be completed, outputting the TE signal as the TE_input signal;
   e. when the count value is smaller than the predetermined count value, comparing the value of RFRP signal to the value of the RFCT signal;
   f. if in step e, the value of the RFRP signal is determined to be greater than the value of the RFCT signal, outputting the TE signal as the TE_input signal;
   g. if in step e, the value of the RFRP signal is determined to be less than the value of the RFCT signal, outputting a peak value of the TE signal as the TE_input signal.

2. The method of determining the slice level of a RFRP signal according to claim 1, wherein the optical storage device is a compact disk-read only memory (CD-ROM) drive.

3. The method of determining the slice level of a RFRP signal according to claim 1, wherein the optical storage device is a digital versatile disk (DVD) drive.

4. The method of determining the slice level of a RFRP signal according to claim 1, wherein the step a further comprises determining whether the TE signal is within a threshold area.

5. The method of determining the slice level of a RFRP signal according to claim 1, wherein the step e further comprises determining whether a zero-crossing signal of the RFRP signal is high.

6. A control circuit for using a radio frequency center (RFCT) signal as the slice level in an optical storage device, outputting a TE_input signal according to a tracking error (TE) signal, a radio frequency center (RFCT) signal, and a RFRP signal, comprising:
   a first comparator, for comparing the amplitude of the TE signal with a threshold value;
   a counter, generating a count value when the amplitude of the TE signal is smaller than the threshold value or resetting the count value when the amplitude of the TE signal is larger than the threshold value;
   a second comparator, outputting the TE signal as the TE_input signal if the count value is greater than a predetermined count value, which corresponds to the situation that the tracking operation is about to be completed; and
   a third comparator, being activated when the amplitude of the TE signal is larger than the threshold value or the count value is smaller than the predetermined count value, wherein the third comparator outputs the TE signal as the TE_input signal if the RFRP signal is larger than the RFCT signal, and otherwise outputs the peak of the TE signal as the TE_input signal.

* * * * *